Dec. 28, 1937.   E. W. VAN AME   2,103,393
GARMENT CUTTER PLOTTING INSTRUMENT
Filed May 18, 1936
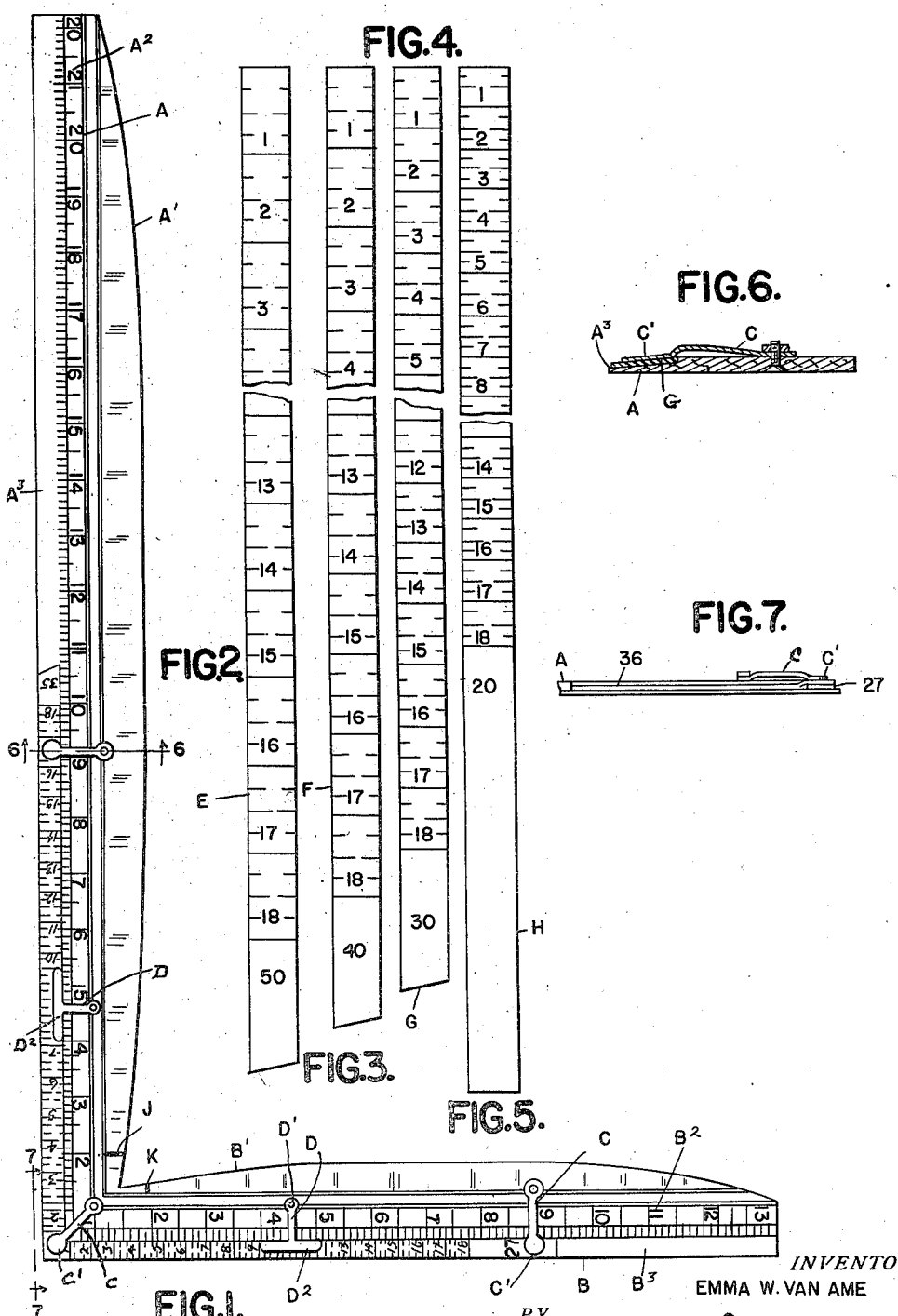
INVENTOR
EMMA W. VAN AME
BY
ATTORNEYS Patented Dec. 28, 1937

2,103,393

UNITED STATES PATENT OFFICE 2,103,393

GARMENT CUTTER PLOTTING INSTRUMENT

Emma W. Van Ame, Detroit, Mich.

Application May 18, 1936, Serial No. 80,324

1 Claim. (Cl. 33—11)

This invention relates to an improved measuring and plotting instrument, for use in compliance with a selected one of a series of directive texts, whereby from representative measurements taken from a person for whom an article of clothing is to be prepared, the proper contourings and proportions of the several constituent pieces, which are later to be sewed together in the finished garment, can be quickly and accurately made. The specific measurement units and proportioned auxiliary parts here described must be understood as being illustrative only, since, for example, in place of inch markings on the branches of the measuring instrument shown, suitable units of the metric system might be substituted without change from the constructional and operative principles here involved.

In the drawing:

Figure 1 is a plan view of my improved article showing selected units of the temporary and substitutable scale pieces which are to be associated therewith during the plotting operation.

Figures 2, 3, 4, and 5 are plan views of representative units of the graduated ribbon or strip scale pieces, whose temporary attachment to the measuring instrument is desired.

Figure 6 is a sectional elevational view, on a large scale, taken along the line 6—6 of Figure 1, and looking in the direction of the arrows there shown.

Figure 7 is a fragmentary elevational view, also on a large scale, taken along the line 7—7 of Figure 1, and looking in the direction of the arrows there shown.

The measuring instrument itself comprises an L-shape unitary piece formed of branches A and B, whose outer or straight edges extend right angularly to one another. The interior or angularly-opposed edges of the branches A and B are curved or arcuate, as at A' and B', to facilitate markings by the operator during the plotting operation. On each of the branches A and B there is an inch scale marking $A^2$ and $B^2$ which is set somewhat back from the outer or straight edges of the respective branches so as to leave blank and preferably slightly beveled plain spaces $A^3$ and $B^3$ immediately adjacent the straight edges. At intervals along each arm, particularly near the point of intersection or union, are positioned resilient clip pieces either of the form shown at C, with a plain rounded head C', or of the form shown at D wherein the anchored end D' is terminally crossed by a branch portion $D^2$, which extends lengthwise of the parts A or B, according to which one of them it is located upon.

The representative strips E, F, G, and H, shown in full plan view in Figures 2 to 5 inclusive, are merely four of a group which may comprise thirty or even more which are furnished with the measuring instrument, preferably in sheet form, to be cut apart and arranged in suitable sequence, ready for use. It will be noted that the figure at the bottom of the proportionately scaled part of each varies in each of these, and for convenience and clarity of understanding let it be assumed that a series of thirty of these have been selected, bearing numbers from 20 to 50 inclusive, or, if desired, a series of double this scope, with half-sizes interspersed, as for example 31½ between 31 and 32. It will be noted that the graduated scale markings on the right hand strip H, shown in Figure 5, are smaller than those on the strip G shown in Figure 4; and that similarly the markings on the strip F of Figure 3 and the strip E of Figure 2 are similarly progressively smaller. The methods or basic standards employed in arriving at these markings and the proportionally increased or diminished size of each need not here be considered, except as the individual strips selected for temporary association with the measuring instrument of Figure 1 are from time to time employed. Let it be assumed that the measurements of a person have been taken which show a thirty-six inch chest circumferential dimension and a twenty-seven inch waist. For the sake of simplicity, let the branch A of the measuring instrument be taken as the chest measurement unit, and the branch B as the waist measurement unit: The strip at whose bottom the figure 36 appears is selected from the available group and positioned with its top end, that is, where the fractional unit I appears in the beveled blank space along the arm A, so that the top edge is in alignment with the straight outer edge of the branch B. Similarly, the unit marked 27 is selected from the group and positioned along the waist measurement branch B, also with its numeraled first space reaching just to the outer straight edge of the branch A, and thus overlapping the similar portion of the strip labeled 36. Each strip is slipped under the outer and resiliently pressing terminals of the several clip pieces C and D, so that they lie in exactly parallel relation with the permanent inch numberings on the respective branches A and B.

The worked-out directions for plotting the proper dimensions and curvatures of the piece of fabric to be marked and then cut, employing, as they do, a combination of numeral markings selected from the permanent inch scales and the removable graduated ribbon or strip scales, each of such markings is now placed in available position for use on the same branch of the plotting instrument whose parts respectively represent the chest and waist measurements already stated. Cooperatively therewith the curved interior edges A' and B' of the instrument's branches are similarly placed for marking purposes in as nearly parallel relation to the scale parts as the curvature makes possible, and the marking and plotting out of the desired design upon a piece of cloth can be rapidly proceeded with. As soon as the directions representing the cutting of the fabric for the respective measurements given are completed, the removable strips representing the thirty-six inch chest measurement and the twenty-seven inch waist measurement may be slipped out from under the holding clips C and D and replaced in the collection as a whole; and assuming, for example, that the next representative cutting was for a thirty-seven inch chest measurement and a twenty-eight inch waist measurement, such removable ribbon units may then be selected from the collection and installed in position on the measuring instrument, for proceeding with the cutting in a manner already described.

At the points J and K on the arms A and B respectively are preferably located guiding or base markings which have to do with the modification of the use of the curved edges A' and B' when certain steps of the cutting of the pattern, particularly the curved lines thereof, are begun upon with the aid of the interior or curved edges A' and B' of the device. They have no relation to either the permanent inch markings or the removable graduated ribbons except as the former have led up to the development of the design or contouring which is the object of this apparatus to aid in the development of.

What I claim is:

A measuring instrument having constituent branches in substantially right-angular relation to one another, each branch being provided with standard linear scale portions along but spaced from its outer edge, the other edge of each branch being curvedly contoured, and means carried by each of said branches for supporting between its edge and the scale portion carried thereby, beside and in operative propinquity to both the edge and the scale portion, any one of a plurality of detachable supplementary linear scales, said supporting means including attaching elements secured to the curved portion of each branch and bridging the first-mentioned linear scale portions and bearing against the space between the edge and said first-mentioned linear scale portions, thereby rendering either its markings or those upon the adjacent graduated edge of the branch available to one who is using the measuring instrument for the selective plotting of guiding markings on a subjacent surface.

EMMA W. VAN AME.